United States Patent [19]

Stengelin

[11] Patent Number: 4,608,724
[45] Date of Patent: Sep. 2, 1986

[54] MACHINE FOR THE DIRECT SOLING OF SHOE UPPERS

[75] Inventor: Ernst Stengelin, Neuhausen, Fed. Rep. of Germany

[73] Assignee: Kloeckner Ferromatik Desma GmbH, Fed. Rep. of Germany

[21] Appl. No.: 663,368

[22] Filed: Oct. 22, 1984

[30] Foreign Application Priority Data

Nov. 30, 1983 [DE] Fed. Rep. of Germany ....... 3343312

[51] Int. Cl.⁴ .......................... A43D 25/20; B29F 1/10
[52] U.S. Cl. .................. 12/17 R; 425/129 S; 425/119
[58] Field of Search ............ 425/119, 129 S, 190, 425/559, 562, 568, 569, 87, 565, DIG. 223, DIG. 224, DIG. 225; 12/17 R, 36, 142 RS, 142 T

[56] References Cited

U.S. PATENT DOCUMENTS

| Re. 28,721 | 2/1976 | Farrell | 425/564 |
|---|---|---|---|
| 3,097,396 | 7/1963 | Ludwig | 425/564 |
| 3,172,161 | 3/1965 | Trueblood | 425/564 |
| 3,191,233 | 6/1965 | Linderoth, Jr. | 425/562 |
| 3,431,600 | 3/1969 | Bullard et al. | 425/564 |
| 3,555,609 | 1/1971 | Chu et al. | 425/129 S |
| 3,994,645 | 11/1976 | Funck | 425/129 S |
| 4,068,995 | 1/1978 | Hayashi et al. | 425/129 S |

FOREIGN PATENT DOCUMENTS

| 110626 | 2/1965 | Netherlands | 425/119 |
|---|---|---|---|
| 957989 | 5/1964 | United Kingdom | 425/119 |

Primary Examiner—Werner H. Schroeder
Assistant Examiner—Steven N. Meyers
Attorney, Agent, or Firm—Watson, Cole, Grindle & Watson

[57] ABSTRACT

A machine for the direct soling of shoe uppers having at least one molding station is provided for conveniently and effectively removing the molding sprue from the die mold which typically remains after each injection molding process. Such is effected by disposing the heel end of each shoe last toward the front working end of the machine at which the operator is stationed. And, the injection molding unit provided for the machine includes a rotary valve which automatically closes as the feed passage of the unit is moved out of alignment with the mold cavity inlet passage, and is automatically open when the feed and inlet passages are aligned in an injection molding operating position of the unit.

7 Claims, 6 Drawing Figures

MACHINE FOR THE DIRECT SOLING OF SHOE UPPERS

BACKGROUND OF THE INVENTION

This invention relates to a machine for the direct soling of shoe uppers, the machine having either a single molding station or a plurality of molding stations aligned adjacent one another. Each such molding station comprises a shoe last holder and at least one shoe last mounted thereon. A shoe upper is fitted on the shoe last, and a die mold has a mold cavity defined together with the shoe last, a mold material inlet passage leading into the mold cavity. An injection mold unit is provided for injecting mold material into the mold cavity through the inlet passage at the heel end of the sole to be molded.

In shoe manufacturing technology, the direct soling of shoe uppers is understood to mean the automatic production of soles while simultaneously mounting the soles on the uppers, sole production preferably being carried out through an injection molding process. The mold material is typically a thermoplastic or rubber.

Machines of this type are generally known as so-called two or four-place machines, i.e., machines having two or four molding stations. Each of these stations has a hopper for containing granular mold material from which the soles are produced. The hopper feeds into an injection molding unit which essentially comprises a worm conveyor, a nozzle and heating means for plasticizing the mold material. The mold which forms a mold cavity together with the shoe last comprises a base die and a pair of side dies which are capable of being laterally separated for opening the mold. The shoe last, together with the shoe upper fitted thereon, is movable downwardly toward the mold. A mold material inlet passage located in the mold dies extends into the mold cavity. And, the shoe last is mounted on a rotatable last holder.

For these known machines, however, each shoe last is typically arranged in such a manner that the heel faces away from the front working end of the machine at which the machine operator is stationed. Thus, the mold material inlet passage likewise faces away from the working end of the machine at an undesireable distance from the operator, thereby making it quite awkward and inconvenient, and even unsafe, for the operator to remove the sprues after each injection molding operation.

And, so-called turntable units have been provided for the direct soling of shoe uppers in which the molding stations are arranged on an annular turntable which is moved past one or more stationary injection mold units. And, the shoe lasts of such machine are arranged in such a manner that the heel cavity into which the injection mold material is fed, is disposed on a side of the machine facing toward the stationary injection mold unit, that is, toward the outside. However, the injection die molds are moved to the separate and stationary injection mold units so that they can be injected directly.

SUMMARY OF THE INVENTION

It is therefore an object of the present invention to provide a machine for the direct soling of shoe uppers in which the sprues can be easily and safely removed after the opening of each injection die mold.

This general objective of the invention is effected by the provision of a machine, of the general type aforedescribed, but which has the heel end of each shoe last facing toward the front end of the machine so as to lie closer thereto relative to the toe end of the last, and the injection mold unit comprises a crank arm mounted injection nozzle a pivotable operating lever connected to the nozzle for shifting the same between operating and non-operating positions respectively into and out of alignment with the inlet passage of the die mold which extends in a direction toward the front end of the machine, the die mold cavity being injected with mold material in such operating position, and provision being made for closing the nozzle passage in the non-operating position of the nozzle.

The present invention offers a particular advantage over prior art machines in that operation of the present machine is made substantially easier and safer, because the removal of the sprues takes place on the side of the machine at which the operator is stationed. Such is made possible in that the injection molding inlet passage of the die mold, through which mold material is fed at the heel end, extends toward the front end of the machine at which the operator is stationed, such that the sprue which forms after each injection molding operation is readily exposed to the operator and can be easily and safely removed. Moreover, the closing of the injection mold passage of the nozzle, so as to prevent excess molding material from oozing out of such passage, is effectively and reliably carried out according to the invention. A rotary valve is provided for such purpose which opens to permit the mold material to flow through the mold material passage of the nozzle, and which is automatically closed when the injection mold device is swung away from the injection die mold thereby cutting off the flow of mold material from the nozzle.

DETAILED DESCRIPTION OF THE INVENTION

Figure 1:
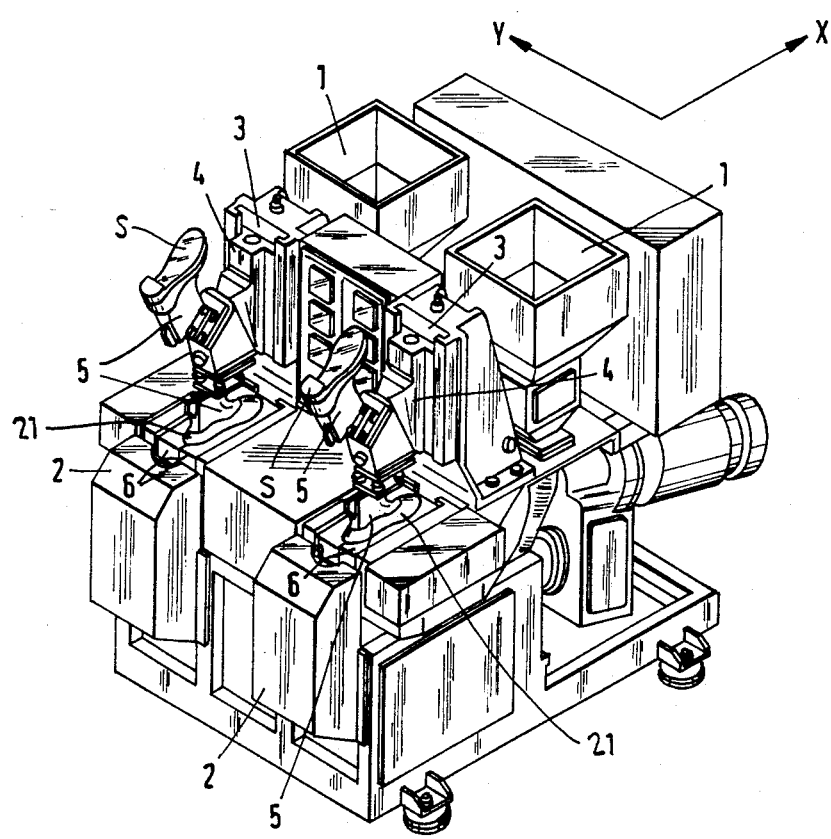
FIG. 1 is a perspective view of a two-place machine for the direct soling of shoe uppers according to the invention.

Turning now to the drawings wherein like reference characters refer to like and corresponding parts throughout the several views, a machine is shown in FIG. 1 for the direct soling of shoe uppers according to the invention which employs an injection molding process, the machine being a two-place machine, i.e., a machine having two molding stations. Granular material provided for the injection molding operation is contained within hoppers 1 of the machine, each hopper being provided for one molding station. A feed conveyor, not shown in FIG. 1, is provided for feeding the mold material, after plastification, to the injection mold unit which is located behind a cover plate 2 at each molding station. The shoe sole can therefore be molded directly in front of the operator stationed at this front working end of the machine.

Each molding station of the machine has a vertical stand 3 which generally comprises a massive casting and is provided with a guide for a holder 4 of the last turning head. This head itself is located behind holder 4 in FIG. 1, and is therefore not visible in the drawing. A pair of opposed shoe lasts 5 is provided on each turning head. The lasts are mounted in place for turning movement about an x-axis. The uppermost shoe last 5, of each opposing pair shown in FIG. 1, is shown after the completion of an injection molding operation with a complete shoe S thereon after the direct soling of the shoe upper. The lowermost last of each opposing pair is shown with a shoe upper 21 fitted thereon and being surrounded by side parts 6 of the die mold. As is typically the case, these side die parts are capable of being separated after the die molding operation, whereafter the sprue is removed, the previously completed shoe S is removed from the uppermost last of the opposing pair of shoe lasts, another shoe upper is fitted on the uppermost shoe last, the holder is turned through 180 degrees and lowered into position as appearing for the lowermost shoe last at each station in FIG. 1.

Figure 3:
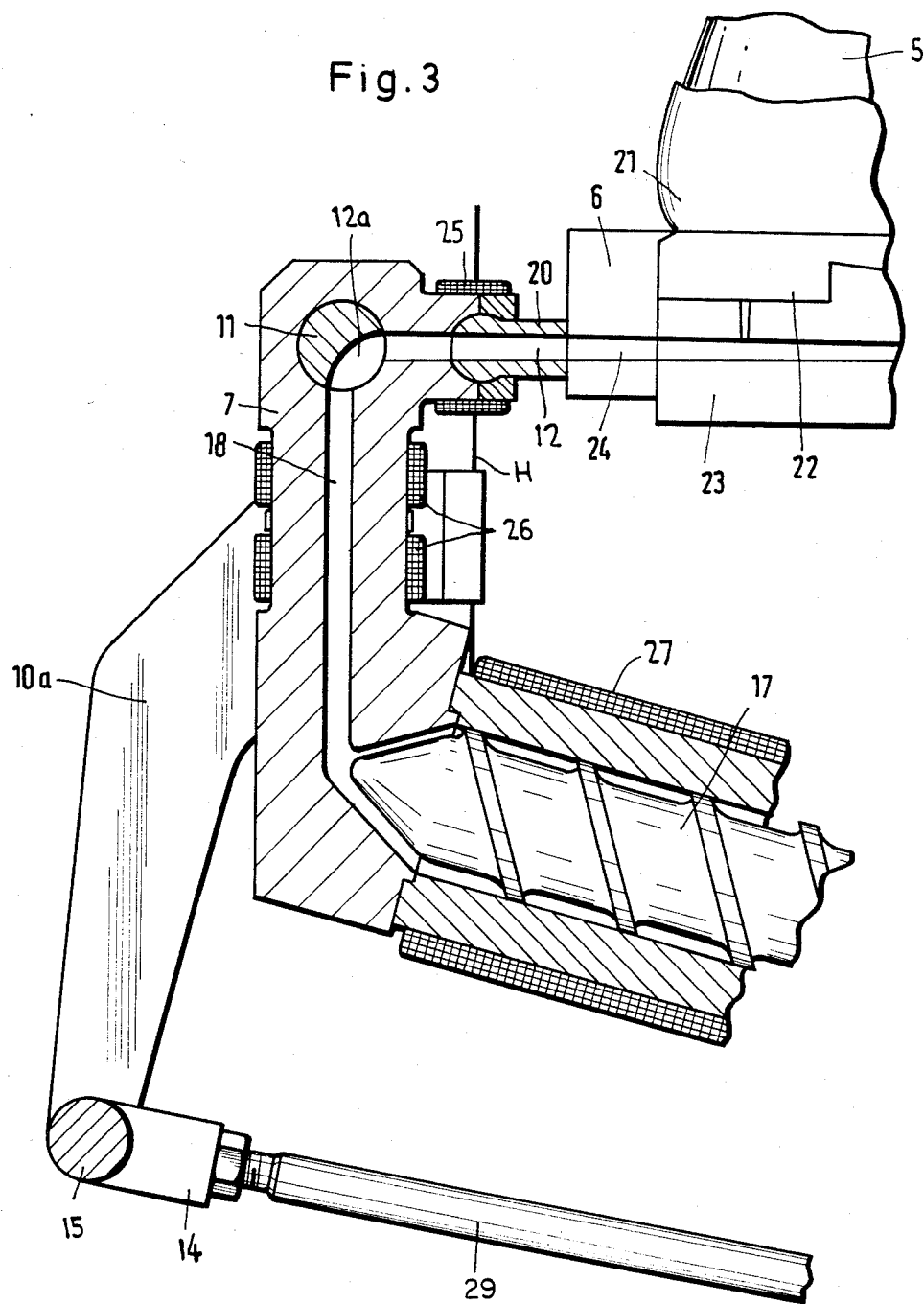
FIG. 3 is a cross-sectional view taken substantially along the line III—III of FIG. 2.
Figure 4:
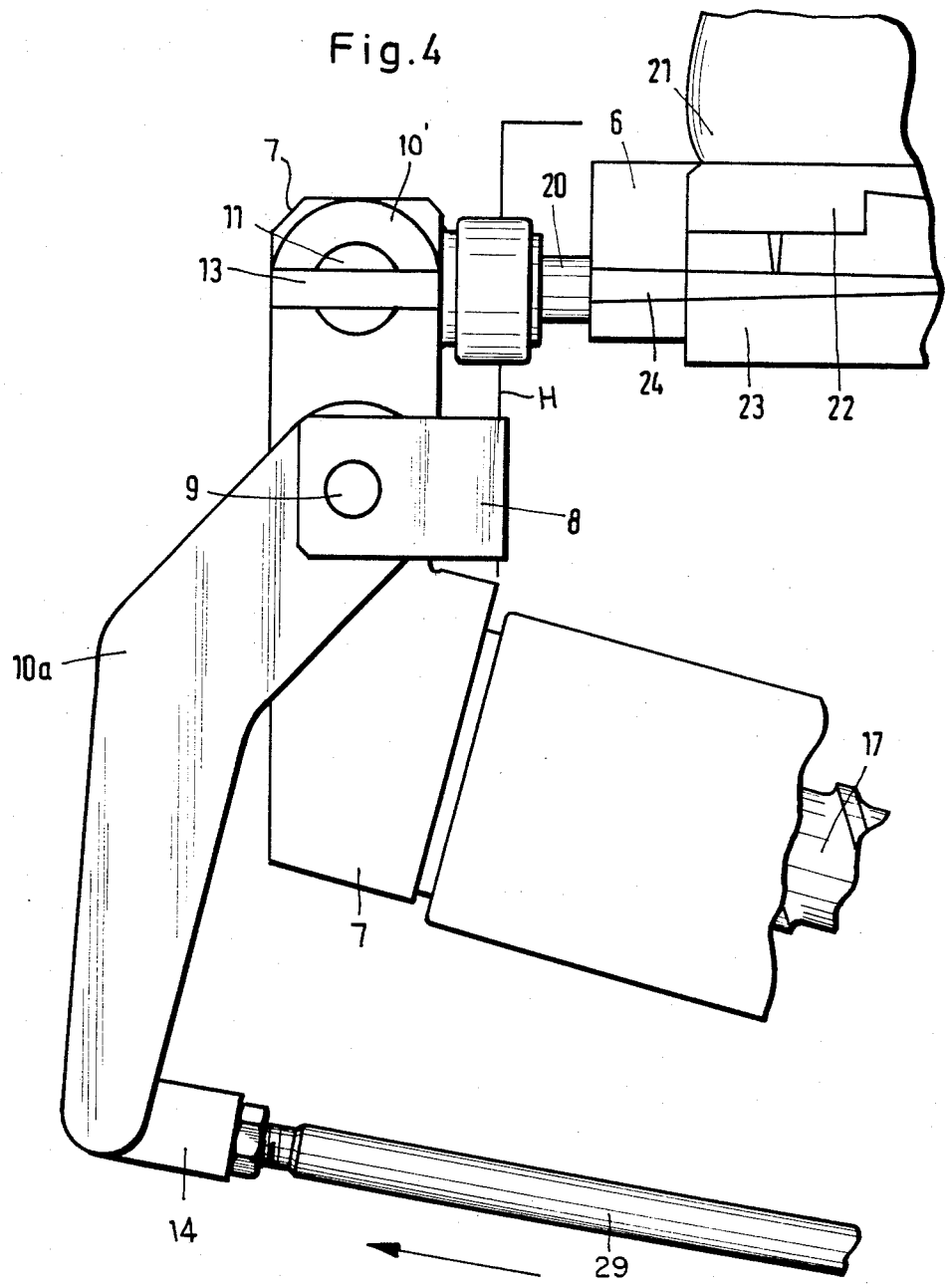
FIGS. 4 and 5 are side elevational views of the injection mold unit according to the invention, FIG. 4 showing its operating position and FIG. 5 showing its non-operating position.
Figure 5:
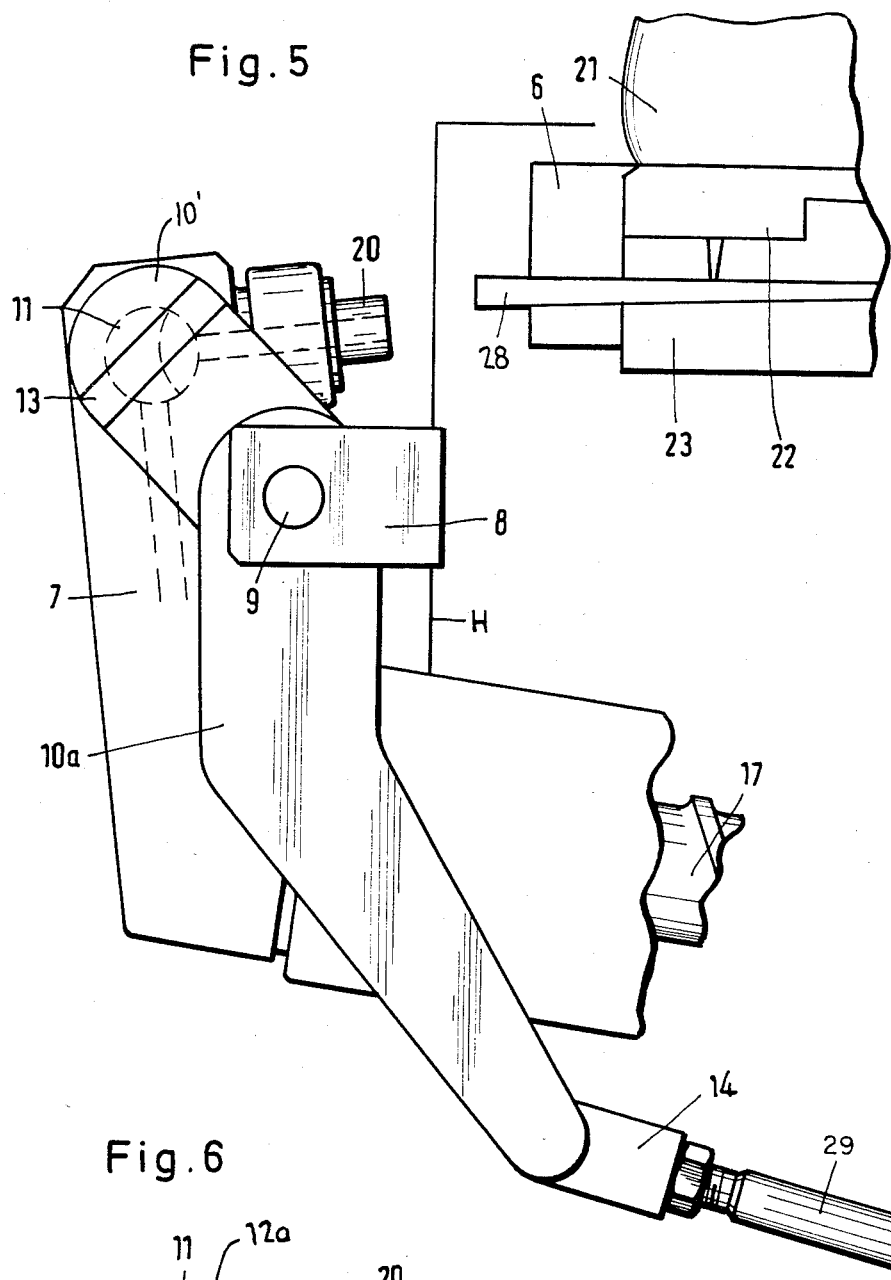

And, prior to injection molding, the shoe last can be adjusted vertically relative to the base die mold, more clearly shown in FIGS. 3 to 5, the shoe last and the side and base die parts of the mold forming a cavity into which the molding material is injected through the heel end for soling the shoe upper.

Injection of the mold material into the injection mold therefore takes place at the operator's side of the machine located at the front working end in FIG. 1. The injection inlet passage of the mold die can be located in the side parts of the die mold or in the base die part, or both, as more clearly shown in FIGS. 3 to 5. It can be clearly seen in FIG. 1, however, that the heel end of each shoe last 5 at each station faces the front end of the machine, located at cover plates 2. The injection molding unit at each station is located behind cover plate 2 and comprises a worm conveyor, a nozzle having a tip, heating units and a pivoting arrangement mounted on the machine housing below the level of the die mold parts.

Figure 2:
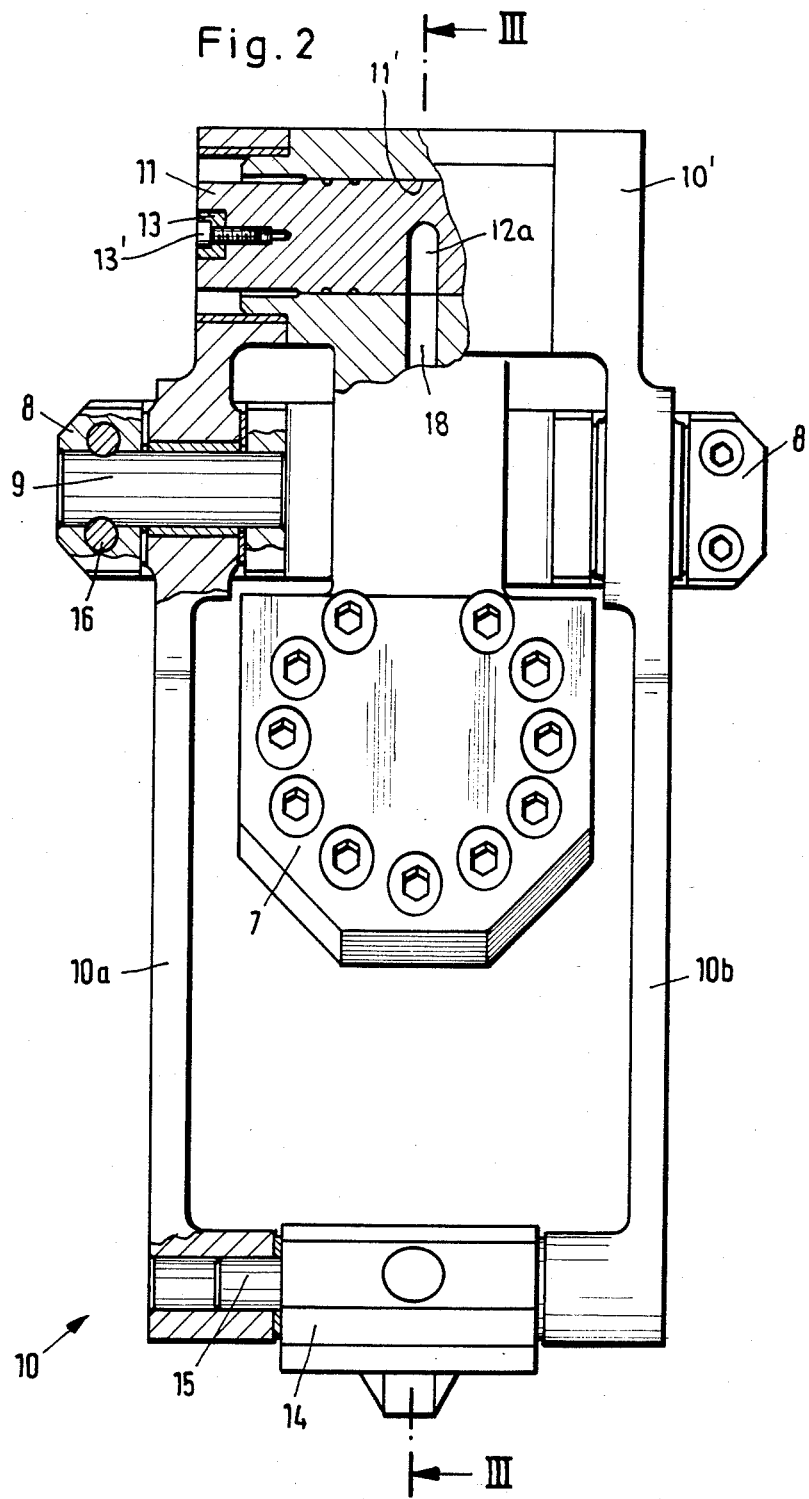
FIG. 2 is a front and part sectional view of an injection mold unit provided for the FIG. 1 machine.
Figure 6:
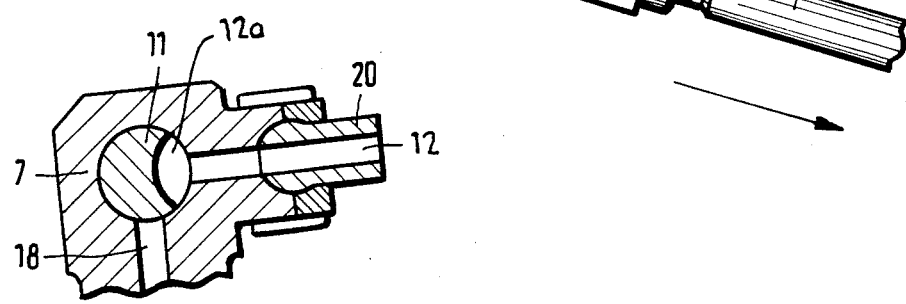
FIG. 6 is a sectional view of an upper portion of the injection mold unit showing the rotary control valve in a closed position during the non-operating position of the injection mold unit.

The injection molding unit according to the invention is shown in FIG. 2 as including an injection molding nozzle element 7. A pair of opposed arm brackets 8 are provided for supporting the nozzle via axle stubs 9 extending laterally from opposing sides of the nozzle, the bracket arms pivotally supporting the axle stubs and being fixedly mounted on machine housing H (FIGS. 3 to 5) at a location behind the injection molding unit. A double arm operating lever 10 is connected to the nozzle for a shifting movement thereof, the lever being rotatably mounted on axle stubs 9 and having a pair of spaced arms 10a, 10b lying on opposite sides of the nozzle. The nozzle includes a laterally extending injection mold passage 12 (FIGS. 3, 6). A rotary valve 11, having an injection mold passage segment 12a formed on the periphery thereof, is provided for closing passage 12 when the injection molding unit is swung out to its FIG. 5 position, and opens the injection mold passage as it thereby interconnects passages 12 and 18 of the nozzle in the FIG. 3 operating position of the injection molding unit, as will be described in more detail hereinafter. The rotary valve is disposed within a cylindrical bore 11' of nozzle 7 for relative rotation thereof about its central axis, and is connected to operating lever 10 at upper bracket end 10' thereof which, as more clearly seen in FIGS. 4 and 5, is angularly related to arms 10a, 10b. The rotary valve extends between opposing sides of upper bracket 10' of the operating lever and is connected thereto via bar elements 13 and fasteners 13'.

The lower ends of arms 10a 10b are coupled together by a coupling element 14 via axles stubs 15 thereof permitting pivotal movement of element 14 relative to the operating lever. And, a circlip 16 is provided for each axle stub 9 for positioning the same within each bracket arm 8.

The injection molding unit of the invention is shown in FIG. 3 in its operating position, and includes a worm conveyor 17 for feeding granular material from the hopper, after plastification, through upright feed passage 18 provided in nozzle 7 and through open rotary valve 11 having its passage segment 12a interconnecting passages 12 and 18 of the nozzle. Thus, lateral passage 12, which opens through nozzle tip 20, is aligned with inlet passage 24 extending through the die mold parts. A die mold cavity 22 is formed between the underside of shoe last 5, on which shoe upper 21 is fitted, and base die 23 as well as side mold die parts 6 which are capable of being separated for opening the mold.

A piston rod 29, of a pneumatic or hydraulic piston and cylinder unit (not shown) provided for operating lever 10, is connected to coupling 14 at the lower end of the operating lever for pivoting the operating lever about the axis of axle stubs 9 which thereby shifts the nozzle in a crank arm fashion between its FIG. 4 and FIG. 5 positions. Heating elements 25, 26, 27 may be provided for heating and regulating the temperature of the molding material as it is fed through the nozzle.

During an extended movement of piston 29 out of its pneumatic or hydraulic cylinder, in the direction of the arrow of FIG. 4, the entire injection molding unit is swung into its FIG. 4 operating position in which the nozzle tip abuts against the outer surface of side die mold parts 6, such that feed passage 12 is in alignment with inlet passage 24, as clearly shown in FIG. 3. The injection molding unit is moved into this operating position from the non-operating position of FIG. 5, and is moved from the FIG. 4 to the FIG. 5 positions upon retracting movement of operating piston 29 within its cylinder in the direction of the arrow of FIG. 5. Because of the crank-type connection between operating lever 10 and nozzle 7, at the upper bracket end 10' of the operating lever, as shown in FIGS. 4 and 5, the operating lever pivots about the axis of stub axles 9, and nozzle 7 together with worm conveyor 17 rotate about the same axis while pivoting about the axis of the rotary valve. Thus, the rotary valve, which is connected to upper bracket arms 10' of the operating lever, is caused to rotate about its central axis from the operating position of FIG. 3 to the non-operating position of FIGS. 5, 6. Passage segment 12a of the rotary valve is so disposed in the outer periphery of the rotary valve that it functions to interconnect passages 12 and 18 of the nozzle in the FIG. 3 position and functions to interrupt at such passages in the FIGS. 5, 6 non-operating position. And, in the non-operating position of FIG. 5, it can be seen that a sprue 28, which typically extends from the die mold after each injection molding process, faces toward the operator at the front end of the machine and can thus be easily and safely removed. Besides, each time the injection molding unit is moved to its non-operating position of FIG. 5, the nozzle feed passages are closed automatically to avoid any oozing out of mold material from the nozzle tip. And, the rotary valve 11 is always open when nozzle tip 20 is pressed against the die mold, and is always closed when the injection molding unit is swung outwardly.

Although a double arm operating lever 10 is illustrated in the drawings, a single arm operating lever can be otherwise provided without departing from the invention.

Obviously, many other modifications and variations of the present invention are made possible in the light of the above teachings. It is therefore to be understood that within the scope of the appended claims the invention may be practiced otherwise than as specifically described.

What is claimed is:

1. A machine for the direct soling of a shoe upper, the machine having a housing and at least one molding station comprising a shoe last holder and at least one shoe last mounted on said holder, a die mold forming a mold cavity together with said shoe last and having an inlet passage at the heel end of said shoe last, an injection molding unit for injecting mold material into said mold cavity through said inlet passage for the direct soling of the shoe upper, said injection mold unit comprising a pivotable injection nozzle having a mold material passage, said nozzle being pivotable into and away from an injection position in an arcuate path, said passage being opened in an injection position and closed in a position away from said injection position by the provision of a shutoff valve, the improvement wherein said injection mold unit is located below said die mold, and said unit further comprising arm brackets fixedly mounted on said housing, axle stubs supported on said brackets, a lever having a pair of spaced lever arms pivotally mounted on said stubs, said injection nozzle pivotally mounted on said stubs for movement into and away from said injection position upon pivotal movement of said lever arms, a coupling extending between and pivotally connected to said lever arms, and means engaging said coupling for effecting the pivotal movement of said lever arms.

2. The machine according to claim 1, wherein said nozzle is mounted between said lever arms.

3. The machine according to claim 1, wherein said shutoff valve comprises a gate valve.

4. The machine according to claim 3, wherein said gate valve comprises a rotary valve.

5. The machine according to claim 4, wherein said rotary valve is supported by said nozzle and is connected with said lever for pivotal movement therewith.

6. The machine according to claim 5, wherein at least one bar member is provided for connecting said valve with said lever.

7. The machine according to claim 1, wherein said axle stubs comprise a pivot axis which lies perpendicular to a central axis along which said inlet passage lies.

* * * * *